United States Patent
Bintz, II et al.

(10) Patent No.: US 10,511,174 B2
(45) Date of Patent: Dec. 17, 2019

(54) MICROINVERTER SYSTEMS AND SUBSYSTEMS

(71) Applicant: SunPower Corporation, San Jose, CA (US)

(72) Inventors: Miles F. Bintz, II, Cedar Park, TX (US); Patrick L Chapman, Austin, TX (US)

(73) Assignee: SunPower Corporation, San Jose, CA (US)

( * ) Notice: Subject to any disclaimer, the term of this patent is extended or adjusted under 35 U.S.C. 154(b) by 414 days.

(21) Appl. No.: 15/199,184

(22) Filed: Jun. 30, 2016

(65) Prior Publication Data

US 2018/0006463 A1    Jan. 4, 2018

(51) Int. Cl.
*H02J 3/38* (2006.01)
*H02S 40/32* (2014.01)

(52) U.S. Cl.
CPC .............. *H02J 3/383* (2013.01); *H02S 40/32* (2014.12); *H02J 3/385* (2013.01); *Y02E 10/563* (2013.01); *Y02E 10/58* (2013.01)

(58) Field of Classification Search
CPC ... H02J 3/383; H02J 3/385; H02J 3/46; H02S 40/32; H02S 40/38
See application file for complete search history.

(56) References Cited

U.S. PATENT DOCUMENTS

| | | | |
|---|---|---|---|
| 2013/0015710 A1* | 1/2013 | Rotzoll | H02M 7/493 307/52 |
| 2013/0207678 A1 | 8/2013 | DeBone | |
| 2014/0084687 A1* | 3/2014 | Dent | H02M 7/53871 307/26 |
| 2015/0054490 A1 | 2/2015 | DeBone | |
| 2017/0187192 A1* | 6/2017 | Jeanty | H02M 7/44 |

OTHER PUBLICATIONS

Data Sheet; Enphase AC Combiner Box; Jun. 20, 2016.
Installation Manual, Enphase AC Combiner Box with Enphase Envoy-S, Rev. 02, 2016.
Installation and Service Guide, Power Manager Installation and Service Guide, SolarBridge Technologies, Nov. 12, 2012.

* cited by examiner

*Primary Examiner* — Carlos Amaya
(74) *Attorney, Agent, or Firm* — Grasso PLLC

(57) ABSTRACT

An alternating current (AC) module system includes branch circuits and a main service panel to receive power from the branch circuits. A photovoltaic (PV) supervisor is located between the branch circuits and the panel. The PV supervisor aggregates the power from the branch circuits. The PV supervisor also performs a nonredundant operational function for one or more of the branch circuits. The PV supervisor includes a gateway device to permit control of the operational functions.

19 Claims, 7 Drawing Sheets

MICROINVERTER SYSTEMS AND SUBSYSTEMS

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

Module-level power electronics (MLPE) serve and support PV cells and PV systems. MLPEs may include microinverters and system supervisors or controllers. Microinverters provide certain features in these multi-part systems, particularly when used in an alternating current (AC) module. Microinverters themselves may include several subsystems to accomplish the functionality needed to provide these features.

DETAILED DESCRIPTION

Figure 1:
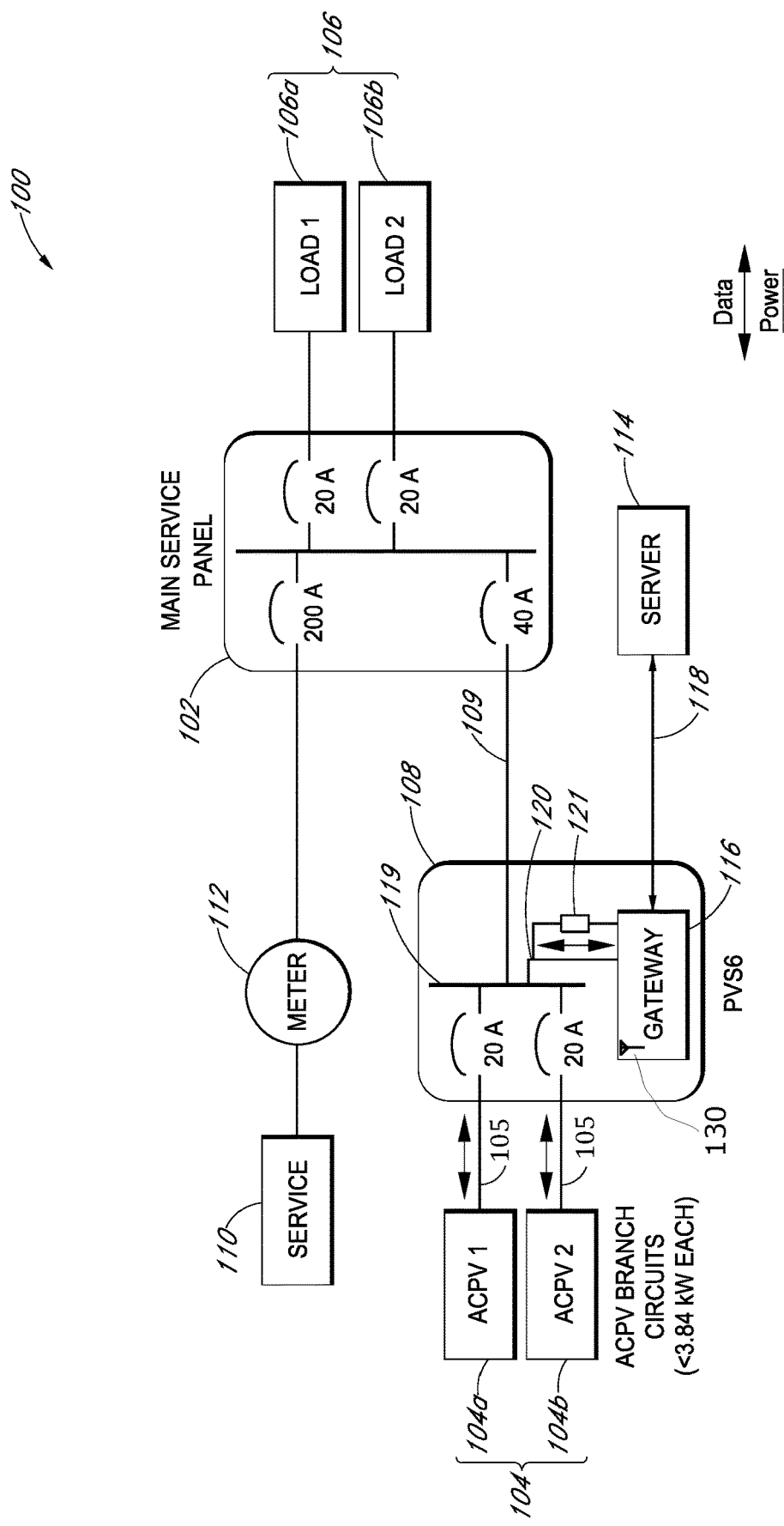
FIG. 1 illustrates an alternating current module system having a photovoltaic supervisor/controller as may be employed in embodiments.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology

The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" solar cell does not necessarily imply that this solar cell is the first solar cell in a sequence; instead the term "first" is used to differentiate this solar cell from another solar cell (e.g., a "second" solar cell). Likewise, a first PV module does not necessarily imply that this module is the first one in a sequence, or the top PV module on a panel. Such designations do not have any bearing on the location of the PV module, substrings, and the like.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

Embodiments may include a multi-component system with one or several groups of peer components and one or more supervisors or controllers. There may be several groups of peer components where each group provides similar or identical services for the system as a whole and likewise offers similar or identical features to the system or other user. There may also be one or more supervisors or controllers serving to manage these groups of peer components and provide interface between the system and external components and users. Communication among and between the peers in a group, among and between peers of different groups, and among and between the groups and the one or more supervisors or controllers may use isolated dedicated communication lines as well as power connections.

In embodiments, redundant functionality offered by peers in a single group or from several groups may be consolidated in one or more locations and removed or less frequently employed in the peers, groups or other components. This hybrid approach, by reducing redundancy of certain features and consolidating how the features may be provided and deployed may be advantageous for various reasons. These may include eliminating unnecessary redundancy, centralizing components for service and repair; centralizing communications; and being able to provide more robust designs because of a centralized topology and its associated elimination of unused backup or other subsystems.

Embodiments may involve PV systems and their components and subsystems. The components may include PV supervisors or controllers as well as PV modules with microinverters. The hybrid approach may include combining and eliminating various subsystems in both the PV supervisors or controllers and the microinverters. These subsystems can include and/or provide input stages and output stages, housekeeping power supplies, communications, output filters, surge protection, chassis protection, and cabling. Other subsystems and components may also be eliminated, combined, and/or centralized in embodiments.

In some embodiments, PV module(s), where a module is one or more modules paired with a single microinverter, may be connected within a system to a photovoltaic (PV) supervisor/controller. This combination may provide or enhance electrical balance of system components, such as overcurrent protection, into a panel including the supervisor/controller that may be electrically connected between an array of AC modules, where a module is one or more modules paired with a single microinverter and the power grid service connection. In addition to the balance of system components, embodiments may be configured to consolidate some microinverter functions into the supervisor/controller or elsewhere in the system.

Some embodiments may segregate functions between the module-level, or other distributed electronics, and the supervisor/controller. In many systems, the electronics will be distributed across a PV module array as well as centralized at or near the main service panel. There may also be a balance of system components. Thus, embodiments may serve to develop an improved partitioning of functions between the distributed, centralized, and a balance of system components.

Microinverters according to some embodiments may include or share the following subsystems. An input stage may convert direct current (DC) power from the solar panel or other DC source to a high voltage (~400V) DC bus, usually with electrical/transformer isolation and may also conduct maximum power point tracking (MPPT). An output stage may convert this high voltage to a grid compatible AC current and may also regulate the bus voltage as a desired set point value. One or more housekeeping power supplies provide a low level of power to logic and control circuitry. These housekeeping power supplies (typically <1 W) may be small power supplies to provide stable voltage rails to logic and control circuitry and there may be more than one supply in embodiments, with each having more than one output voltage. Communication circuits may provide communications to and from the PV supervisor/controller with some employing power line carrier functionality. Microcontrollers and digital signal processors may provide the control functions, which may include dynamic regulation of signals and regulatory functions. Filters may reduce electrical distortion on the AC output and may include passive components such as inductors and capacitors, which can serve to reduce electrical distortion on the AC output of a microinverter. This distortion may be in the form of low frequency distortion (IEEE 1547, for example), harmonics, or high frequency distortion (FCC part 15, for example). Surge protection may also be included. This surge protection may include topology being directly coupled to or partially embedded with an output filter with durability suitable to survive thousands of voltages in excess of normal line voltage. Metal-oxide varistors may be employed in embodiments to provide surge protection. A chassis housing the electronics and providing mounting and/or installation features; and, one or more cables connecting the microinverter to peers, other components of the system, e.g., a connection to the PVS, and for receiving DC input, may be included as well.

Some embodiments include microinverters having an active filter stage to replace the high voltage DC bus configuration. These microinverters may also include an AC link transformer. As power is generated by the solar panel in the PV module, the microinverter converts it into AC current using some or all of these components.

In some embodiments, a service panel may connect to the different microinverters within the PV modules through the PV supervisor/controller. The supervisor/controller may include gateway functions with overcurrent protection and branch circuit aggregation. Data may be communicated via power line carriers (PLC) to and from the PV modules. Data communication may be exchanged with servers using a gateway device, for example, via the Internet. The gateway device may be coupled with wires or a wireless service to the server. For example, the gateway device may connect to the server using a homeowner's router via hardware or WiFi.

In other embodiments, surge protection is removed, or significantly reduced, in each microinverter while adding a surge suppressor to the PV supervisor/controller. Surge suppressors may be placed into subpanels as a matter of practice or necessity to protect the PV modules, especially in locales having an increased incidence of lightening. As such, the surge suppressor within the supervisor/controller may be a replacement of an existing component or redesign of that component. Being preinstalled in the supervisor/controller may save effort for the system installer. Each microinverter may have sufficient surge suppression to protect the line, so that a plurality of microinverters may offer overly redundant surge protection. In some embodiments, this redundancy may be reduced or eliminated.

The disclosed system may also combine high-speed communication lines with the AC cables leading to the microinverters. This combination may be achieved with or without the surge suppressor in the supervisor/controller. Communication wires may be bundled with the AC power wires within each microinverter cable. Further, drop cables from a rooftop may be run alongside the communication wires. This may be an alternative to PLC, which may be susceptible to line noise and numerous troubleshooting tasks. Because the termination of the AC cables is at the PV supervisor/controller, embodiments may terminate the communication wires within the same enclosure.

A physical layer may be used, which would be largely immune from noise and conventional PLC troubleshooting. The physical layer may also provide a faster response for communications. Further, it might be more reliable and provide more inherent security. Such a configuration may be helpful in newer applications requiring faster and more reliable communications. Other hardwired forms of communication are also possible.

The PV supervisor/controller may also deliver power to the PV modules via the same hardwired bundle as communications. For example, a power supply may be placed in the supervisor/controller. The power supply may be a stand-alone unit or integrated with the gateway device. Gateway circuits may include their own power supply, but it may not be useful for powering the PV modules. In some embodiments, the housekeeping power supplies for the PV modules may be eliminated or significantly reduced, such as to a simple postregulator or point-of-load circuits.

The power provided may be power over the data lines. The redundancy of power supplies in microinverters may be eliminated or greatly reduced by having a single, higher power supply in the supervisor/controller. The higher power supply may be made highly efficient and may be less cost sensitive as only one is needed. Further, more space may be available in the supervisor/controller than in the microinverters for such a power supply.

In some embodiments, the power supply may be used in special circumstances, without substantially altering the power supplies present in the microinverters. Power supplies in the microinverters may be fed from the DC (solar) input and, therefore, operate with threshold daylight. The power supply based in the PV supervisor/controller may be used as a means to supply power when ample daylight is not present. It may power some subcircuits of the microinverters for a small amount of the time. These embodiments may be useful to installers attempting to commission or otherwise communicate with components within the system as the sun sets or daylight is not available. The power supply does not need to be particularly efficient, highly performing, or have a substantial power rating.

In embodiments, a filter may be added to the PV supervisor/controller and some or all output filter components may be removed from the microinverters. The aggregate functions may be placed in the supervisor/controller with the filter aiding in reducing lower frequency distortion, such as IEEE 1547 harmonics, or higher frequency distortion, such as EMI/FCC electrical noise. The filter may also selectively block some frequencies, such as a chosen PLC frequency. Other generators, rather than PV modules, may be connected to the supervisor/controller that may or may not communicate via PLC.

One or more sensors may be equipped with the PV supervisor/controller. In some embodiments, two current sensors may be coupled to the output filter and the current sensors may be current transformers (CT) or any other suitable current sensor. Voltage, temperature, and other types of sensors may be employed in the supervisor/controller. For example, the current sensors may be coupled to the input and the output of the filter, if one is used in the supervisor/controller. The sensors may be used to monitor PV power production and energy consumption and in some embodiments the sensors may be integrated with the supervisor/controller and may not require a separate installation.

In addition to PV production, the current sensors may be used to improve the harmonic performance of the PV module system. For example, it may be difficult for the microinverters to monitor and correct for distortion because they have reduced filtering. The gateway device, however, may be configured to sense the collected PV current and, with its processing capability, calculate the appropriate predistortion or other correction signals to be used by the microinverters. These signals may be sent to the microinverters via the communication lines disclosed above. A wide range of conditions may be addressed using this process.

The current sensors also may be used for current limiting, fault detection, or otherwise comply with regulatory requirements. Limits on power output may be required due to net export limitations. When detecting a current that is out of range or otherwise unsuitable, the PV supervisor/controller may cause the microinverters to disable their power output, curtail their power, or otherwise alter their behavior using the communication wires.

In some embodiments, other generating units aside from PV modules are coupled to the supervisor/controller, such as gas generators, grid-interactive storage devices, and the like. Additional circuit breakers may be added to accommodate more generators. Any suitable overcurrent protection configuration may be used, particularly because circuit breakers are large physically and somewhat expensive. For example, a current sensor with detection circuitry may be used to sense an overcurrent. By augmenting some or all of the breaker lines with controlled switches, such as relays, the current may be interrupted without using a conventional circuit breaker.

In other embodiments, the gateway device may provide the sensing and calculation necessary to determine the phase angle of the power line. Normally, microinverters employ phased-locked loops (PLL) circuits to perform this function. This feature may be computationally intensive, especially in consideration of highly-distorted line voltages, so it may be that the computation burden for the microinverters can be reduced by consolidating the PLL function in the supervisor/controller. The supervisor/controller may provide, via the communication wires, a synchronizing signal by which all microinverters would base their own phase angles.

At a deeper level of synchronization, the high-frequency switching outputs of the microinverters may be synchronized, though not necessarily simultaneous. The converters may require a high-frequency modulation signal from their output, such as pulse width modulation (PWM).

Many inverter topologies use a fixed-frequency modulation, or one that is fixed for some period of time or under some operating conditions. In some embodiments, the communication line may coordinate the switching of microinverters to generate overall higher performance or lower costs. For example, if two or more converters are switching at the same frequency, their switching events may be phase-shifted so that their switching edges occur at advantageous times. Multi-phase converters may be difficult to implement in microinverter applications. With coordination between the microinverters, such a configuration may be achievable. By the multi-phase technique, each converter switches at a desired frequency. The effective frequency of the combined outputs may be higher when multiplied by the number of phased converters. This feature allows filtering components to be smaller as their impedances generally scale with frequency. Thus, use of filter components within the microinverters themselves and in the supervisor/controller (if applicable) may be improved.

Embodiments may also involve varying the switching frequencies of the converters so as to create destructive interference among the microinverters. This technique may be similar to the multi-phase technique, but is targeted toward reducing electromagnetic interference (EMI). In other words, the frequencies of each microinverter may be different so that no concentration of noise occurs at one particular frequency. The frequency and the phase selection may be designed so that one microinverter may cancel components of noise of another. In effect, the supervisor/controller would assign frequencies and phase shift to each microinverter to achieve a desirable result.

In some embodiments, an AC module system is employed. The AC module system includes a plurality of ACPV branch circuits. The AC module system may also include a PV supervisor/controller coupled to the plurality of ACPV branch circuits to aggregate power from the branch circuits. The PV supervisor/controller may be configured to perform a nonredundant operation function for each of the ACPV branch circuits. The performance of the nonredundant operational function may require an exchange of ACPV operational data between the ACPV branch circuits and the PV supervisor/controller. The AC module system may also include a main service panel to receive aggregated power from the PV supervisor/controller via a main line. The AC module system may also include a gateway device located within the PV supervisor/controller to permit control of the operational functions of each of the plurality of ACPV branch circuits. The control is preferably capable of being performed apart from the PV supervisor/controller.

In embodiments, a PV supervisor/controller from an AC module system may also be employed. The PV supervisor/controller may include cable connections to ACPV branch circuits, a main power line to receive power from the cable connections, and a gateway device to monitor the power and to communicate using communication wires connected to the cable connections and a surge suppressor coupled to the main power line. The PV supervisor/controller may still further include a filter on the main power line and a power supply to supply power to the photovoltaic branch circuits through the communication wires.

In embodiments, a method for generating power within an AC module system may be provided. The method may include receiving power signals from a plurality of ACPV branch circuits at a PV supervisor/controller where the PV supervisor/controller may be coupled to a main service panel via a main line. The method may also include aggregating the power signals within the PV supervisor/controller, filtering the power signals in the PV supervisor/controller, and detecting information about the power signals using a gateway device within the PV supervisor/controller. Nonredundant operational instructions for the PV branch circuits may be communicated to the PV branch circuits using the PV supervisor/controller in embodiments.

FIG. 1 depicts an AC module system 100 having a supervisor/controller 108 according to some embodiments. System 100 includes main service panel 102 that collects power generated from one or more branch circuits 104 and delivers it to one or more loads 106. A branch circuit may refer to a PV module having a solar panel and a microinverter as well as several solar panels and a microinverter. As shown in FIG. 1, branch circuits 104a and 104b deliver power, but any number of branch circuits may be included. Further, branch circuits 104 may be rated at greater than 3.84 kiloWatts (kW) each. Loads 106 include load 106a and load 106b, but any number of loads may be connected to main service panel 102.

PV supervisor/controller 108 is coupled between branch circuits 104 and main service panel 102. PV supervisor/controller 108 may aggregate power from branch circuits 104. PV supervisor/controller 108 may also perform operational functions for each of the branch circuits, as disclosed in greater detail above and below. Using cables 105, PV supervisor/controller 108 exchanges operational data with branch circuits 104. PV supervisor/controller 108 may perform operations that replace or mirror operations done by the microinverters within each branch circuit 104. Antenna 130 is also labelled in FIG. 1.

Power is received from branch circuits 104 over cables 105 to power bus 119 in PV supervisor/controller 108. Preferably, cables 105 are AC cables that deliver about 20 amps of current from the microinverters located in each branch circuit 104. Power bus 119 delivers the aggregated power, or current, to main line 109. Main line 109 delivers the aggregated power to main service panel 102, which distributes the power to loads 106.

PV supervisor/controller 108 also monitors this process and provides control operations on the power collection as well as the functions of branch circuits 104. Although the term "supervisor" is used with regards to disclosed embodiments, the components also may act as a controller as indicated by the shared term supervisor/controller used herein. Thus, PV supervisor 108 may have passive or active monitoring control within system 100. PV supervisor 108, therefore, may be considered a power and control hub between branch circuits 104 and main service panel 102. PV supervisor 108 may include a certain topology, disclosed below, and centralization of functionality. As will be shown, the disclosed embodiments may remove redundant operations performed in the microinverters and place them in PV supervisor 108.

PV supervisor 108 also includes gateway device 116. Gateway device 116 may perform gateway functions, such as overcurrent protection and branch circuit aggregation. Gateway device 116 may perform algorithms and operations to optimize power generation on branch circuits 104. As such, it receives data and power from each branch circuit 104 via connection 120. Gateway device 116 also may communicate with the microinverters within branch circuits 104. Centralized server 114 also communicates with gateway device 116 via connection 118. Connection 118 may be wired or wireless connection over a network, such as the Internet using a router. Gateway device 116 and server 114 may exchange information about branch circuits 104, system 100, and PV supervisor 108 as well as other information.

PV supervisor 108 also includes logic circuitry 121. Logic circuitry 121 may include processors, memory storage, and other components to receive information along with gateway device 116 to perform operations within branch circuits 104. These operations may be disclosed in greater detail below. Logic circuitry 121 may be coupled between power bus 119 and gateway device 116. Alternatively, the logic circuitry may be incorporated into gateway device 116.

In other embodiments, gateway device 116 may be a separate component from PV supervisor 108. In this instance, gateway device 116 connects to PV supervisor 108 to receive information about aggregated power and to exchange data with the microinverters as well as server 114.

Other components in system 100 include service box 110 and meter 112. Additional components may be incorporated, though not shown. In some embodiments, PV supervisor 108 is incorporated into main service panel 102. PV supervisor 108 and gateway device 116 may be located in the panel. Alternatively, PV supervisor 108 may be located closer to branch circuits 104, especially if the branch circuits receive power from the PV supervisor.

Figure 2:
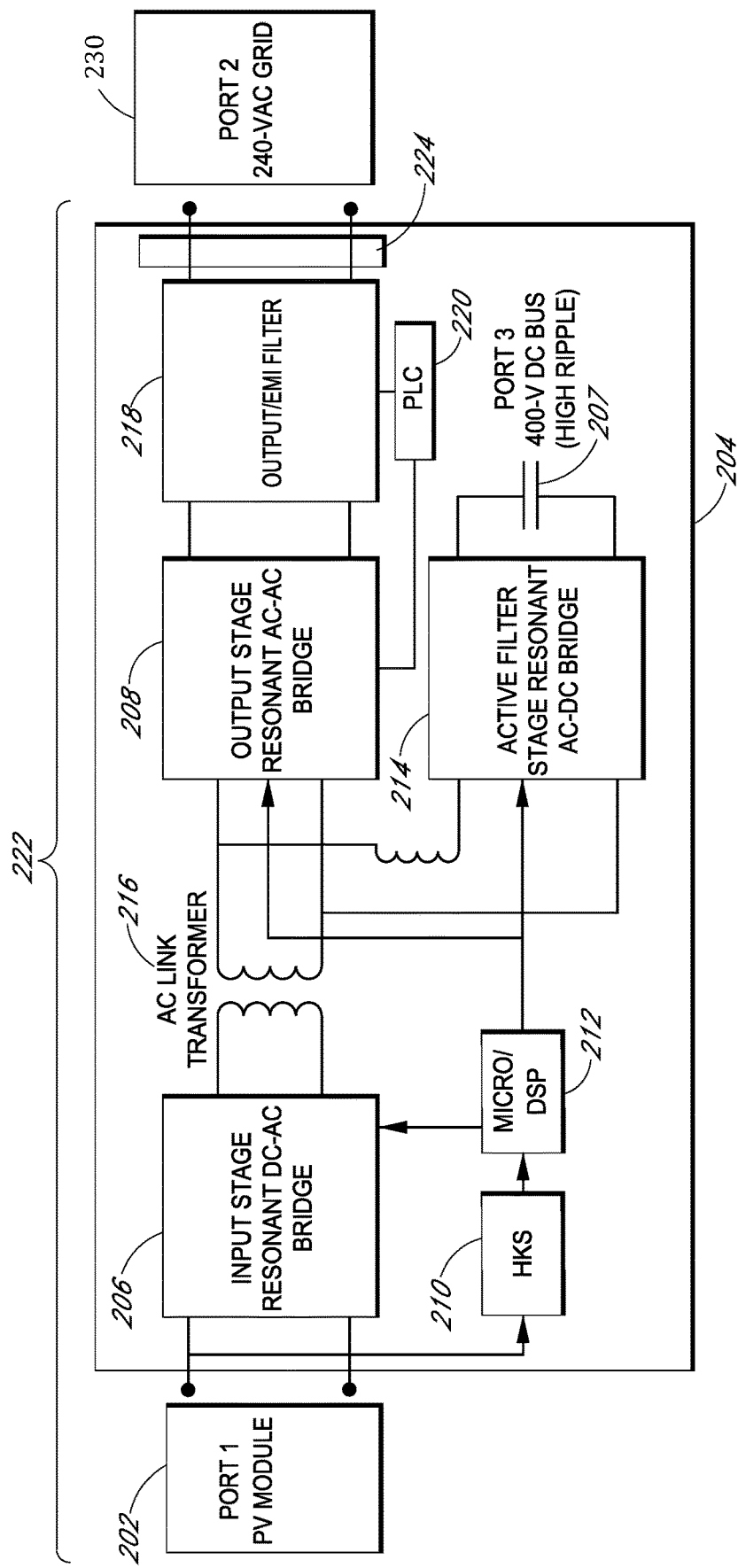
FIG. 2 illustrates a microinverter for a photovoltaic module as may be employed in embodiments.

FIG. 2 depicts a branch circuit 106 having a PV module 202 and microinverter 204 according to some embodiments. The components shown in FIG. 2 are an example topology. Other topologies may be used for branch circuits 106, including those with different components. A chassis 222 may enclose one or more of PV module 202 and microinverter 204.

Microinverter 204 is coupled to a PV module 202. PV module 202 may be a solar panel that collects solar energy and converts it into power. Preferably, the power is DC power. The power is received by input stage 206, which also may be known as a boost stage. Preferably, input stage 206 may be a resonant DC-DC bridge circuit. Input stage 206 may convert the received power to a high voltage, with electrical/transformer isolation provided by AC transformer 216. Input stage 206 also may conduct maximum power point tracking (MPPT). In some embodiments, input stage 206 may provide the converted voltage to a high voltage DC bus 207 or to an active filter stage 214. In yet further embodiments, high voltage DC bus 207 may be a 400 volt DC bus. High voltage DC bus 207 may be known as a high ripple bus.

Output stage 208 converts the high voltage to a grid compatible AC current that is output through cable 105, disclosed above. The high voltage may be on high voltage bus 207. Output stage 208 also is coupled to AC transformer 216. Output stage 208 may be a resonant AC-AC bridge circuit. Output stage 208 also may be coupled to filter 218, which receives the output current to reduce electrical distortion. Filter 218 may include passive components, such as inductors and capacitors, to reduce the distortion. The distortion may be in the form of low frequency harmonics or high frequency interference.

Microinverter 204 also includes housekeeping power supply (HKPS) 210 to provide stable voltage to logic and circuitry within the microinverter. More than one HKPS 210 may be implemented. Each HKPS 210 may have more than one output voltage. In some embodiments, microinverter 204 may not include a HKPS 210 at all, and, instead, receives power from PV supervisor 108 over cable 105. HKPS 210 also should be able to operate from a relatively high voltage from the panel voltage or the high voltage bus 207 but regulate down to as little as 1 volt or less.

Microcontroller/digital signal processing circuit (Micro/DSP) 212 may conduct most or all of the control functions for microinverter 204. Such functions may include dynamic regulation of signals and regulatory functions. Micro/DSP 212 may receive power from HKPS 210. In the absence of a HKPS 210, then micro/DSP 212 may receive power from PV supervisor 108.

An active filter stage 214 may be coupled to output stage 208. Active filter stage 214 serves to decouple the high voltage capacitor 207 from other voltages in the microinverter 204. Active filter stage 214 may include a resonant AC-DC bridge circuit and may receive information and instructions from micro/DSP 212.

Powerline carrier (PLC) circuit 220 may include circuits dedicated to providing communications to and from PV supervisor 108 though wires within cable 105. PLC circuit 220, therefore, may be a communication circuit for microinverter 204. Cable 105 includes wires and connectors for connecting the AC output of microinverter 204 to PV supervisor 108. Alternatively, cable 105 may connect to another microinverter or chain of microinverters that eventually connect to PV supervisor 108.

Microinverter 204 also may include a surge suppressor 224. Surge suppressor 224 may be coupled to output filter 218. In some embodiments, surge suppressor 224 may be partially embedded in filter 218. Surge suppressor 224 includes circuitry to protect against high voltage surges on the AC line. Surge suppressor 224 may provide surge protection that causes microinverter 204 to survive thousands of voltages in excess of normal line voltage. The circuitry of surge suppressor 224 may comprise metal-oxide varistors (MOVs).

Figure 3:
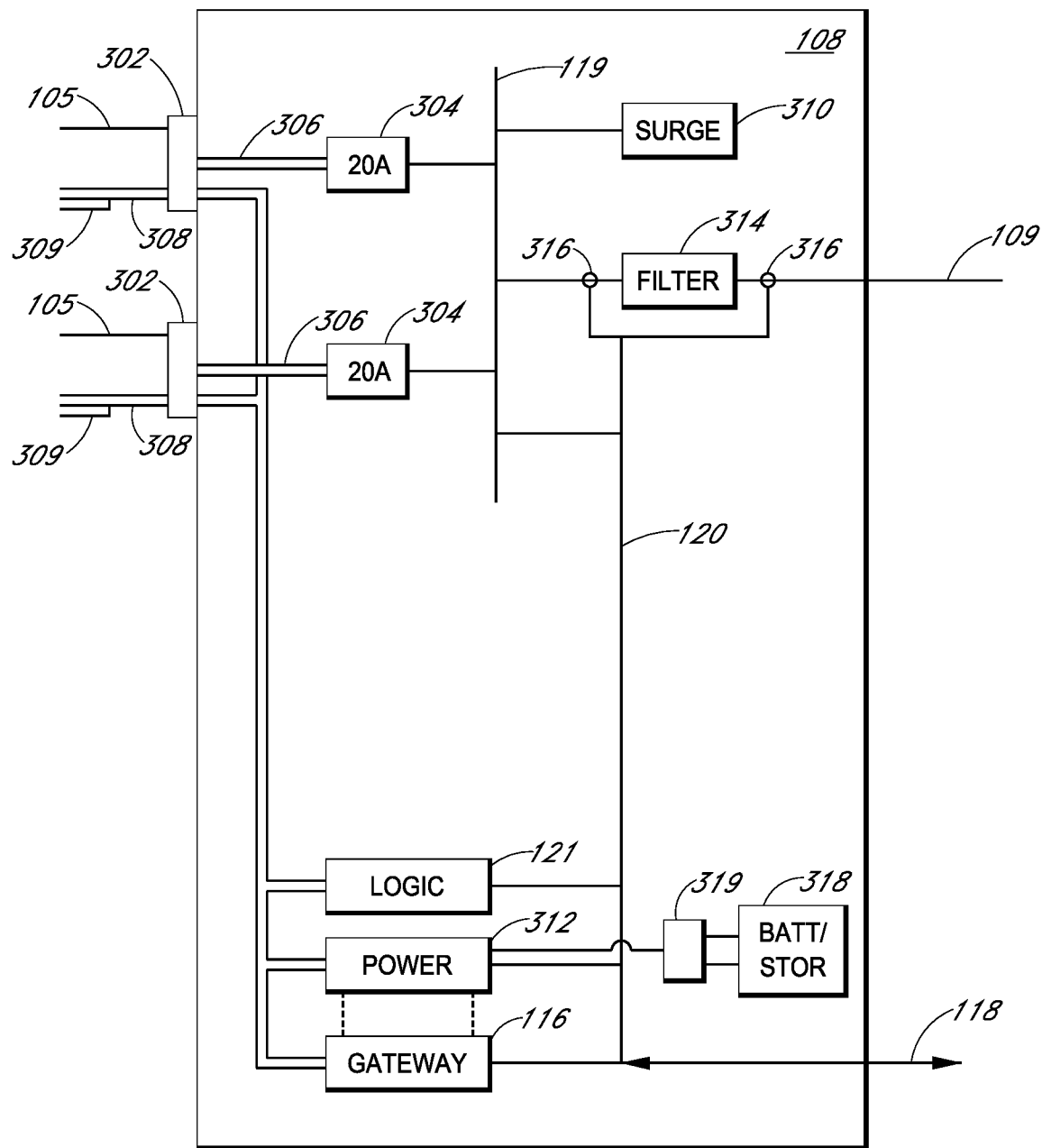
FIG. 3 illustrates a photovoltaic supervisor/controller as may be employed in embodiments.

FIG. 3 depicts an example topology for PV supervisor 108 according to some embodiments. PV supervisor 108, as shown in FIG. 1, includes gateway device 116 and logic circuitry 121. It also receives power from branch circuits 104 through cables 105. Cables 105 may be connected to PV supervisor 108 by connectors 302. The AC current is received at circuit breakers 304. Circuit breakers 304 may be 20 amp breakers. In addition, power connections 306 supply the current, which may be about 16 amps (i.e., 80% of breaker rating) as well as other values, to circuit breakers 304.

One or more additional components may be included in PV supervisor 108 to provide additional operational features. In some instances, these features replace similar functionality within microinverters 204. This may eliminate or reduce redundant components throughout the microinverters. In turn, the removal of redundant components may reduce costs of implementing system 100.

One such function may be surge suppression. PV supervisor 108 may include surge suppressor 310. Surge suppressor 310 may be coupled to main line 109 via power bus 119. In other embodiments, surge suppressor 310 may be coupled directly to main line 109. Surge suppressor 310 provides surge protection for microinverters 204 coupled to PV supervisor 108. Surge suppressors 224 in microinverters 204 may be removed or reduced to eliminate redundancy in system 100.

Another refinement may be to combine high-speed communication line with cables 105 leading to microinverters 204. Thus, communication wires 308 may be included. Communications wires 308 may connect to gateway device 116 and other components within PV supervisor 108. In some embodiments, communication wires 308 are bundled with the AC power wires within cables 105. Drop cables 309 from a rooftop may be run alongside communication wires 308. Use of drop cables 309 may be an alternative to PLC communications, which is susceptible to line noise and numerous troubleshooting tasks. Another physical layer, such as RS-485, may also be used. Preferred physical layers may be immune from noise, for the most part, as well as provide a faster response. Moreover, certain physical layers, such as those employing RS-485, may be more reliable and have more inherent security.

The bundle of communication wires 308 with cables 105, and with or without drop cables 309, may allow PV supervisor 108 to deliver power to microinverters 204. Power supply 312 is included for these embodiments. In some embodiments, power supply 312 may replace HKPS 210 within microinverters 204. Branch circuits 104 may be built without the need to include power supplies to provide power to logic circuits and components. This may reduce the need to convert the relatively high power going into a HKPS 210 into a smaller voltage signal. Power supply 312 is shown as a standalone unit but may be integrated with gateway device 116.

In embodiments, power supply 312 may be used in conjunction with the housekeeping power supplies within microinverters 204. In such instances, when adequate power is not available at a branch circuit 104 due to low sunlight or other low power conditions, power supply 312 may provide power via communication wires 308 to accommodate the power requirements. The power supplied to microinverters 204 under such a scenario may only power certain subcircuits or operate for a small amount of time. HKPSs 210 may be reduced to simpler circuits, such as a postregulator or point-of-load circuit. In this instance, communication wires 308 may be twisted pair or Ethernet cables or other suitable wiring approach to send the power.

Gateway device 116 may monitor power received from each branch circuit 104 to determine when a low power condition exists. It may instruct power supply 312 to provide power to microinverters 204. Logic circuitry 121 may also help in this analysis. Such a feature may be useful to installers attempting to communicate with the branch circuits in a low power situation. Further, if server 114 requests information on a branch circuit 104 via gateway device 116, then the gateway device may "wake up" the branch circuit to provide the information by providing the power from power supply 312.

In some embodiments, reactive power may be injected into branch circuits 106. If PV supervisor 108, using power supply 312, can provide enough power to power microinverter 204, then it may be able to provide the reactive power into branch circuits 106. The reactive power may include current that is about 90 degrees out of phase with the voltage. Thus, PV supervisor 108 may change the phase of the current or voltage of power onto the grid. The disclosed embodiments may use the different phases to identify and correct problems, as disclosed in greater detail below. Moreover, by using power supply 312, injection of reactive power may occur at night. Thus, one may schedule such tests and maintenance in the evening. For example, server 114 may instruct gateway device 116 to communicate to power supply 312 to inject the reactive power at times when power is not being generated by branch circuits 106. This may avoid problems of injecting power out of phase during the day when power is being generated.

Use of power supply 312 may eliminate or reduce redundancy within microinverters 204. Each microinverter 204 will not need a full power supply. Further, power supply 312 may be made more efficient and less cost sensitive than each HKPS 210 within each microinverter 204. PV supervisor 108 also includes more space to fit a larger power supply 312. Power supply 312, therefore, need not be particularly efficient, highly performing, or have a substantial power rating.

Filter 314 may be included in PV supervisor 108 to replace filters 218 within microinverters 204. This feature eliminates or reduces redundancy as the aggregated function of filtering is performed centrally. Filter 314 may be located on the output of main line 109 to filter the signal before it is delivered to main service panel 102. Alternatively, one or more filters 314 may be located with circuit breakers 304.

Filter 314 may reduce lower frequency distortion or higher frequency noise. Filter 314 also may selectively block some frequencies, such as a chosen PLC frequency like 110 kHz used in some microinverters. Actually, PLC filtering may not be needed as communications using PV supervisor 108 may be conducted with a hardwired connection. Thus, use of filter 314 may reduce this need of filtering within system 100.

One or more sensors 316 may be included in PV supervisor 108. In some embodiments, sensors 316 may be coupled to the input and output of filter 314 to test and correct the filter. In some embodiments, sensors 316 may be current transformers, but voltage, temperature, and other types of sensors may be used. In fact, other sensors 316 may be coupled to other components within PV supervisor 108, especially if filter 314 is not present.

Gateway device 116 or logic circuitry 121 may receive the data collected by sensors 316. These devices may use the data to monitor PV production and home energy consumption. In some embodiments, sensors 316 are integrated with PV supervisor 108 and may not require a separate installation, which may reduce extra work. Further, sensors 316 may collect and provide data that improves the performance of system 100 and branch circuits 104.

For example, sensors 316 may be used to improve the harmonic performance of system 100. In such an example, microinverters 204 may have reduced filtering if filter 314 is implemented. Thus, it may be more difficult for the microinverters to monitor and correct for distortion. Gateway device 116, however, may sense the collected PV current and, possibly in conjunction with logic circuitry 121, calculate the appropriate predistortion or other correction signal to be used by microinverters 204. Such information may be provided by communication wires 308. This feature may be useful because a varying number of microinverters 204 may be installed with PV supervisor 108, thereby causing a wide range of conditions to be encountered.

Sensors 316 also may be used for current limiting, fault detection, or complying with requirements such as those from regulatory agencies. For example, limits on power output may be required due to net export limitations. In this instance, PV supervisor 108 may cause, via communication wires 308, microinverters 204 to disable their power output, curtail their power output, or otherwise alter behavior when detecting a current that is out of range or otherwise unsuitable. Various limits may be established and checked against by PV supervisor 108 using one or more sensors 316.

Most of the above examples pertain to branch circuits that are AC modules. The disclosed embodiments, however, may be extended to other generating units, such as gas generators or grid-interactive storage devices. Additional circuit breakers 304 may be added to accommodate more generators. Further, circuit breakers 304 are depicted, but any suitable overcurrent protection means can be used, especially as circuit breakers may be physically large or costly. For example, a sensor 316 with detection circuitry may be used to sense an overcurrent. By augmenting some or all of the (previous) breaker lines with controlled switches, such as relays, the current may be interrupted without using a circuit breaker.

In some embodiments, gateway device 116 or logic circuitry 121 may provide the sensing and calculation to determine the phase angle of the power lines from branch circuits 104. Every microinverter 204 may calculate the phase angle of the power line, such as cable 105. With PV supervisor 108, high speed communication with microinverters 204 may be implemented.

The determination of the phase angle normally may be done with phase-locked loop (PLL) circuits. These circuits may be placed in each microinverter 204. This aspect may be computationally intensive, especially in consideration of highly-distorted line voltages. Thus, the computation burden for microinverters 204 may be reduced by consolidating the PLL function in PV supervisor 108. PV supervisor 108 may provide via communication wires 308 a synchronizing signal by which all microinverters 204 would base their own phase angles. For example, in the United States, synchronization would be to the 60 Hz power line.

In embodiments, a deeper level of synchronization may be achieved. The high frequency switching outputs of microinverters 204 may be synchronized, though not necessarily simultaneous. High-frequency modulation signals may be outputted, often as pulse width modulation. Some topologies use a fixed-frequency modulation or one that is fixed for some period of time or under some operating conditions. The disclosed embodiments may use communication wires 308 to coordinate the switching of microinverters 204 to generate overall higher performance or lower cost.

Thus, if two or more converters are switching at the same frequency, the switching events may be phase-shifted so that the switching edges occur at advantageous times. Multi-phase converters may be difficult to implement in microinverter applications. With coordination between the microinverters, such implementation may be achieved. By the multi-phase technique, each converter may switch at a desirable frequency. The effective frequency of the combined outputs may be higher, as multiplied by the number of phased converters. This allows filtering components to be smaller as the impedances generally scale with frequency. This may reduce cost of filter components in microinverters 204 or filter 314 in PV supervisor 108.

Thus, the effective frequency seen by PV supervisor 108 may increase by the number of microinverters 204. This increase may shrink the size of filter 314 or the filters in microinverters 204. It also may allow for the cancellation of harmonics as amplitudes may be phase shifted. For example, in system 100 of 10 microinverters 204, the even numbered inverters may have a phase shift of 0 degrees while the odd numbered inverters may have a phase shift of 180 degrees.

In some embodiments, the switching frequencies may be varied so as to create destructive interference among microinverters 204. This feature may be similar to the multi-phase technique, but is more targeted toward reducing electromagnetic interference (EMI). The frequencies of microinverters 204 may be different so that there is no concentration of noise at one particular frequency. The frequency and phase selection may be designed so that one microinverter 204 can cancel components of noise of another microinverter. Thus, PV supervisor 108 may assign frequencies and phase shift to each microinverter 204 to achieve a desired result. For example, one microinverter may produce +1 volt of noise while another microinverter produces −1 volt of noise. The microinverters also may be allowed to produce more noise than usual. Control signals may be sent to microinverters 204 via communication wires 308.

PV supervisor 108 also includes battery or energy storage device 318. As power is aggregated in PV supervisor 108, some may be stored in device 318. In other embodiments, more than one storage device 318 may be implemented. As can be seen, battery/storage 318 may be coupled to power supply 312 via charging circuit 319. Charging circuit 319 may protect battery 318 and comprise a diode, capacitor, switch and the like.

Figure 4:
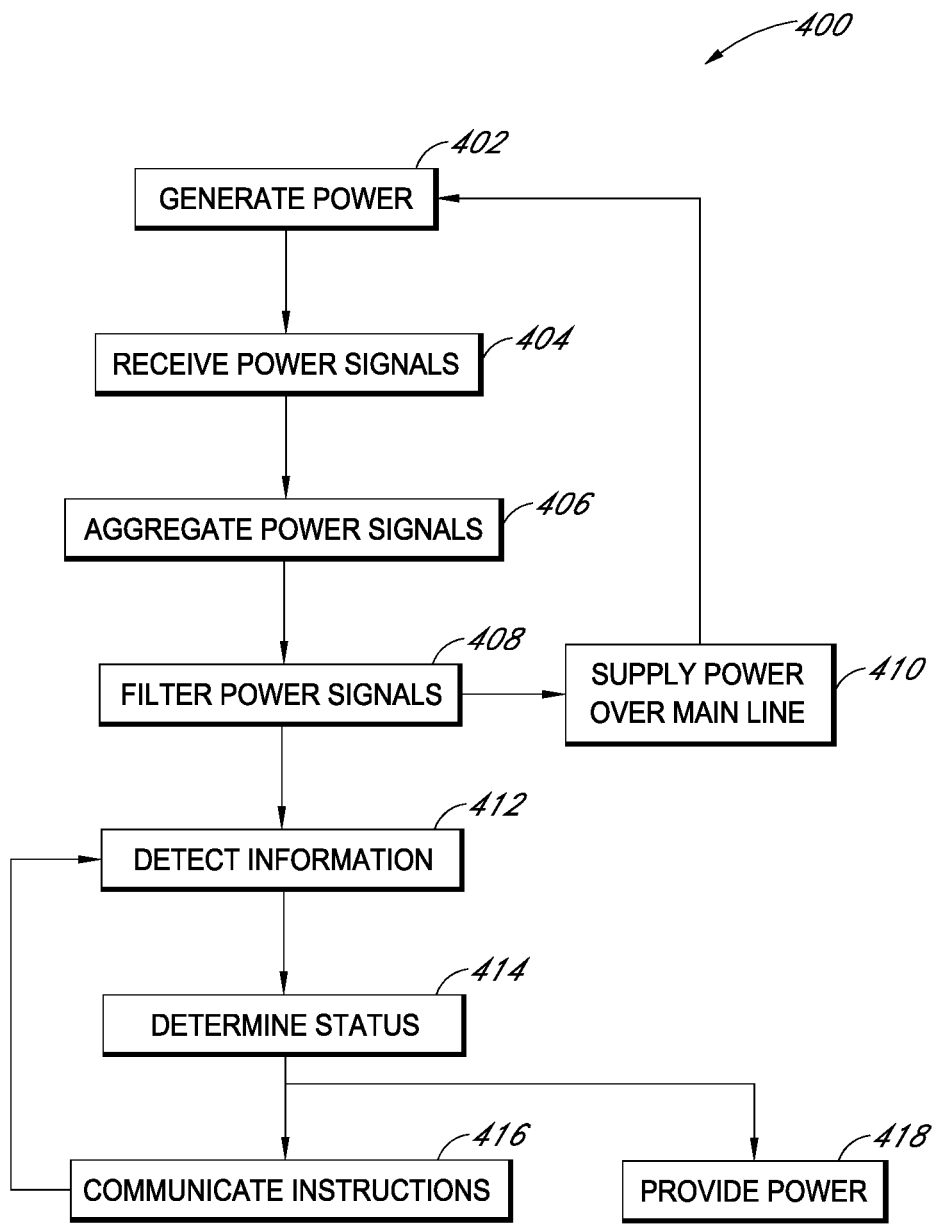
FIG. 4 illustrates a flowchart for generating power within an AC module system as may be employed in embodiments.

FIG. 4 depicts a flowchart 400 for generating power within system 100 according to some embodiments. Reference may be made to elements shown in FIGS. 1-3 for illustrative purposes. The embodiments herein are not limited to the topologies shown in these figures.

Step 402 executes by generating power within branch circuits 104 of system 100. Branch circuits 104 may be PV modules that generate power from received solar energy. Branch circuits 104 may convert this energy into a power signal, such as a current, that is output from each circuit to PV supervisor 108.

Step 404 executes by receiving the power signals from branch circuits 104 at PV supervisor 108. Cables 105 may connect to PV supervisor 108 from each branch circuit 104. The signals may flow through circuit breakers 304 to power bus 119. Step 406 executes by aggregating the power signals with PV supervisor 108. PV supervisor 108 is coupled to main service panel 102 via main line 109.

Step 408 executes by filtering the aggregated power signals in PV supervisor 108 using filter 314. In some embodiments, filter 314 may be removed and filtering performed in microinverters 204 of branch circuits 104. Step 410 executes by supplying the aggregated power to main service panel 102 over main line 109.

Step 412 executes by detecting information about the power signals using gateway device 116 within PV supervisor 108. One or more sensors 316 may be used to detect information about the signals. Alternatively, gateway device 116 may receive individual power signals directly. As disclosed above, such information may include frequency, noise, phase shift, amplitude, and the like. Gateway device 116 or logic circuitry 121 may use this information to determine a status for the power signals, as executed in step 414.

Step 416 executes by communicating the instructions for branch circuits 104 to the branch circuits using PV supervisor 108. In some embodiments, the instructions are nonredundant operational instructions in that they are instructing or providing functions to microinverters 204 that are not being done at the microinverters. Using the status of the received power signals, PV supervisor 108 may determine some action needs to be taken and communicates to microinverters 204 using communication wires 308. Examples of instructions are disclosed above.

Step 418 executes by providing power to microinverters 204 from PV supervisor 108. Power supply 312 may be used to provide power to the microinverters when it is determined that a low power condition is occurring. Other actions may require power to be supplied from PV supervisor 108, as disclosed above.

FIGS. 5 to 9 depict example embodiments of PV supervisor 108 coupled to branch circuits 104. These figures may show example topologies used by PV supervisor 108. As a result of these topologies, the components within branch circuits 104 may change. Components within PV supervisor 108 shown in FIGS. 5 to 9 are disclosed above, and, are not necessarily repeated in the description below.

Figure 5:
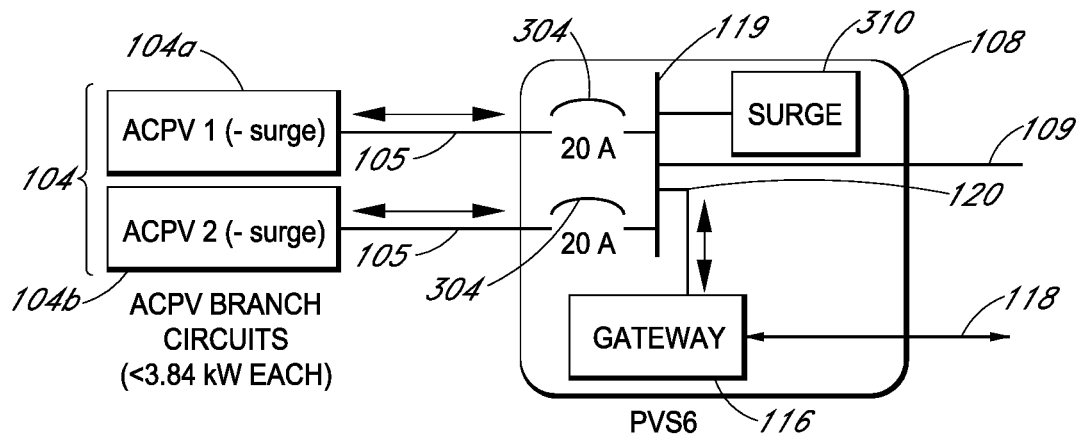
FIG. 5 illustrates a photovoltaic supervisor/controller connected to photovoltaic modules as may be employed in embodiments.

FIG. 5 illustrates PV supervisor 108 connected to branch circuits 104 (photovoltaic modules) as may be employed in some embodiments. PV supervisor 108 includes gateway device 116 having connections 118 and 120. Gateway device 116 may communicate with branch circuits 104. PV supervisor 108 aggregates power from branch circuits 104 to deliver to main service panel 102 using main line 109.

PV supervisor 108 also includes surge suppressor 310. As shown, surge suppressor 310 is coupled to power 119. As disclosed above, surge suppressor 310 may be preinstalled in PV supervisor 108 to protect the branch circuits. As a result, branch circuits 104 may have their respective surge suppressors (shown as surge suppressor 224 in FIG. 2) removed. This feature reduces redundancy within the branch circuits and possibly lowers costs.

Figure 6:
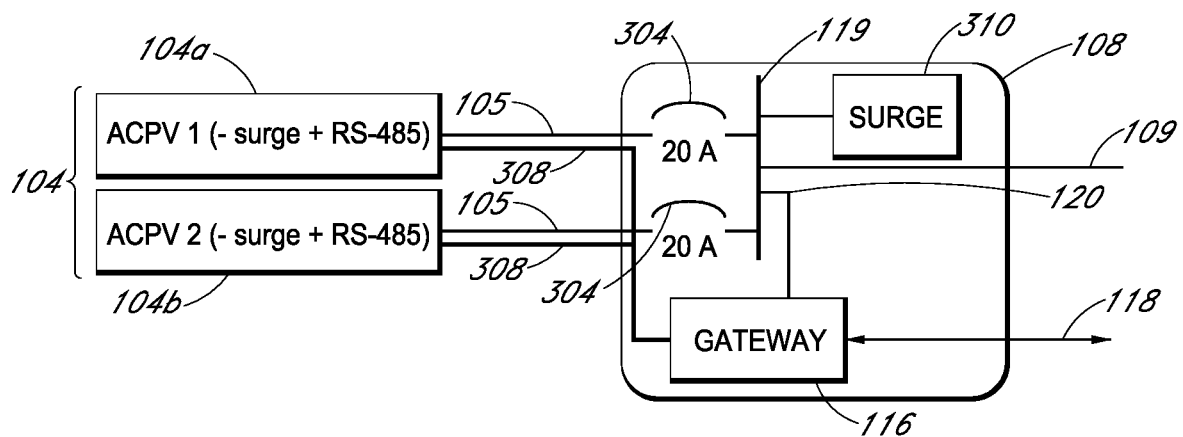
FIG. 6 illustrates a photovoltaic supervisor/controller connected to photovoltaic modules as may be employed in embodiments.

FIG. 6 depicts PV supervisor 108 connected to branch circuits 104 as may be employed in some additional embodiments. PV supervisor 108 includes surge suppressor 310 and gateway device 116, along with other components to collect and monitor power from branch circuits 104. PV supervisor 108 also includes a communication capability to communicate with the branch circuits.

In these embodiments, gateway device 116 may exchange data with branch circuits 104 using communication wires 308. As noted above, communication wires 308 may be bundled with AC cables 105 to attach to each branch circuit 104. As disclosed above, various suitable physical layers may be employed including PLC transmit and receive circuits and RS-485 communication standards to provide communication capabilities and physical layer support to these communications.

Figure 7:
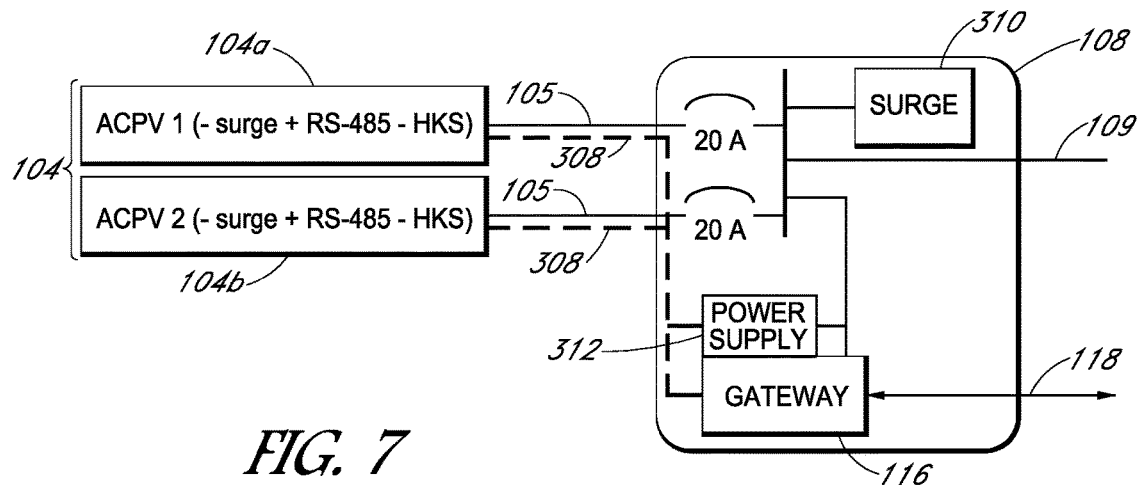
FIG. 7 illustrates a photovoltaic supervisor/controller connected to photovoltaic modules as may be employed in embodiments.

FIG. 7 depicts PV supervisor 108 connected to branch circuits 104 as may be employed in some additional embodiments. PV supervisor 108 includes power supply 312. As shown, power supply 312 may be a standalone unit or, alternatively, may be integrated with gateway device 116.

As disclosed above, power supply 312 may supply power to branch circuits 104 via the same hardwired bundle as communication wires 308. Branch circuits 104 also may have one or more of their housekeeping power supplies (shown as housekeeping power supply 210 in FIG. 2) eliminated or significantly reduced. Thus, this feature also may eliminate or reduce redundancy within branch circuits 104.

Figure 8:
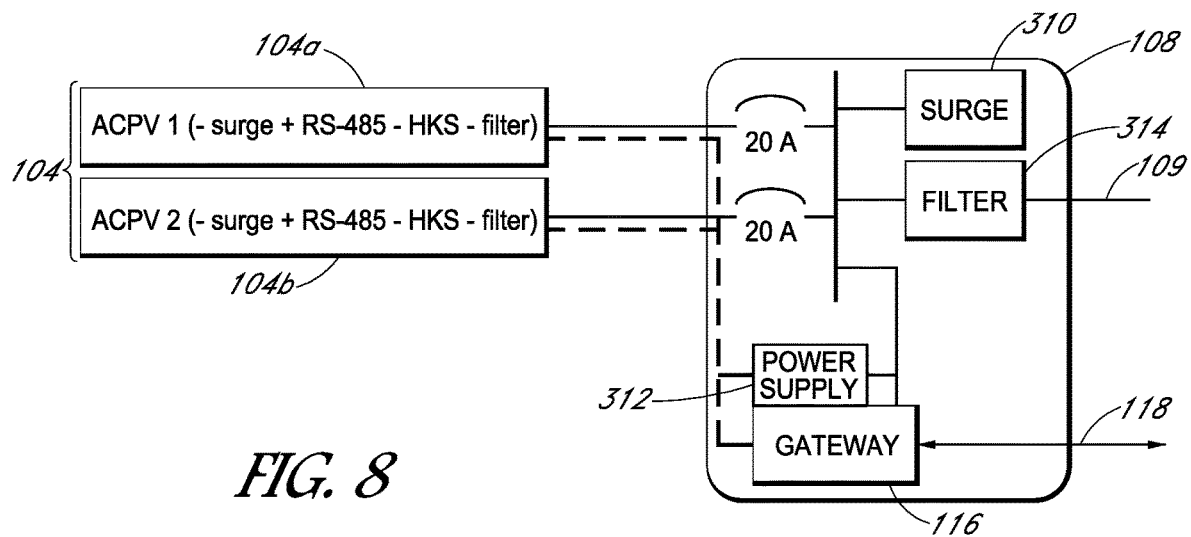
FIG. 8 illustrates a photovoltaic supervisor/controller connected to photovoltaic modules as may be employed in embodiments.

FIG. 8 depicts PV supervisor 108 connected to branch circuits 104 as may be employed in some additional embodiments. PV supervisor 108 includes filter 314. As disclosed above, some or all of the filter components may be removed from branch circuits 104. Filter 314 is shown connected to main line 109 but the filter components also may be placed at circuit breakers 304. As with the other embodiments, filter components within branch circuits 104 may be eliminated or reduced to rid the branch circuits of redundancy.

Figure 9:
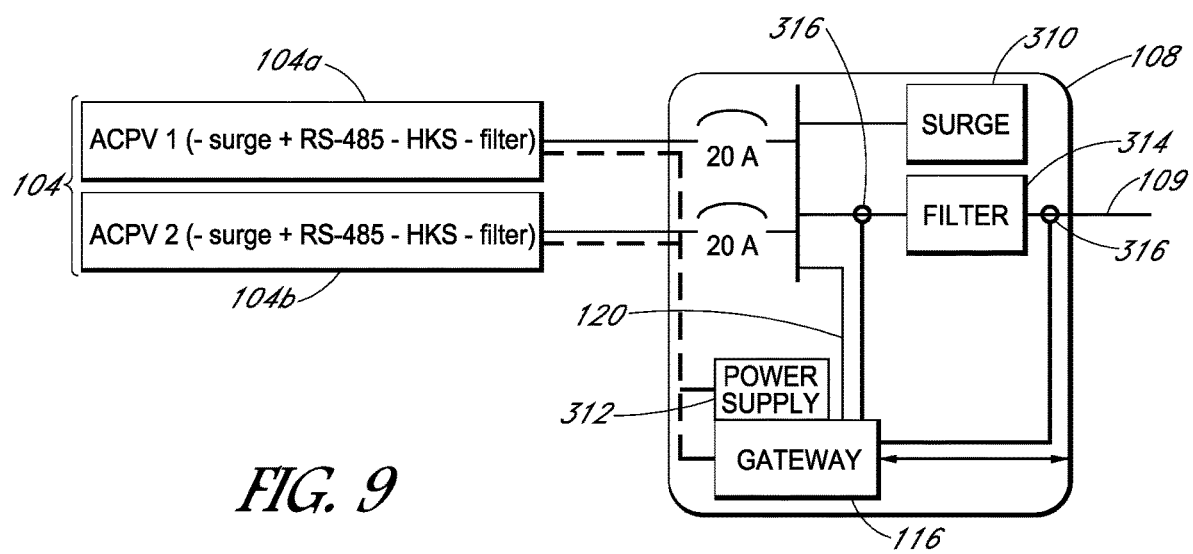
FIG. 9 illustrates a photovoltaic supervisor/controller connected to photovoltaic modules as may be employed in embodiments.

FIG. 9 depicts PV supervisor 108 connected to branch circuits 104 as may be employed in some additional embodiments. PV supervisor 108 includes one or more sensors 316. As shown, sensors 316 are located at the input and output of filter 314, but may be located elsewhere within PV supervisor 108, especially if a filter is not used therein. For example, sensors 316 may be located on main line 109 or connected to circuit breakers 304. Gateway device 116 may obtain data about the power being aggregated within PV supervisor 108 using sensors 316. As shown in FIG. 9, sensors 316 may be coupled directly to gateway device 116.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An alternating current (AC) module system comprising:
    a plurality of AC photovoltaic (PV) branch circuits;
    a PV controller coupled to each of the plurality of ACPV branch circuits and configured to aggregate power from the coupled branch circuits, the PV controller configured to perform a nonredundant ACPV operational function for each of the ACPV branch circuits, the performance of the nonredundant ACPV operational function requiring an exchange of ACPV operational data between the ACPV branch circuits and the PV controller;
    a gateway device located within the PV controller configured to permit control of the operational functions of each of the plurality of ACPV branch circuits, the control capable of being performed apart from the PV controller; and
    a power supply located within the gateway device configured to supply power to the plurality of ACPV branch circuits.

2. The AC module system of claim 1, further comprising a main service panel positioned to receive aggregated power from the PV controller via a main line; and
    a surge suppressor located within the PV controller to provide surge protection for the main line.

3. The AC module system of claim 2, wherein the plurality of ACPV branch circuits do not include a surge suppressor.

4. The AC module system of claim 1, further comprising a plurality of AC cables connected to the plurality of ACPV branch circuits, wherein a plurality of communication wires is bundled with the plurality of AC cables, the plurality of communication wires coupled to the PV controller.

5. The AC module system of claim 4, further comprising a plurality of drop cables bundled with the plurality of communication wires.

6. The AC module system of claim 1, wherein the power is provided from the power supply over a plurality of communication lines coupled to the plurality of ACPV branch circuits.

7. The AC module system of claim 1, wherein the plurality of ACPV branch circuits do not include housekeeping power supplies.

8. The AC module system of claim 1, wherein the power supply is integrated with the gateway device.

9. The AC module system of claim 1, wherein the power supply is controlled by the gateway device to provide power to the plurality of ACPV branch circuits.

10. The AC module system of claim 1, further comprising a filter located within the PV controller, wherein the filter is coupled to a main line and to the main service panel.

11. The AC module system of claim 1, further comprising one or more sensors located on the main line in the PV controller.

12. The AC module system of claim 11, wherein the one or more sensors is a current transformer sensor.

13. The AC module system of claim 11, wherein the gateway device is configured to control the function on the plurality of ACPV branch circuits using information from the one or more sensors.

14. A photovoltaic (PV) controller for an alternating current (AC) module system, the PV controller comprising:
   cable connections to alternating current (AC) photovoltaic (PV) branch circuits;
   a main power line to receive power from the cable connections;
   a gateway device to monitor the power and to communicate using communication wires connected to the cable connections;
   a surge suppressor coupled to the main power line;
   a filter on the main power line; and
   a power supply to supply power to the photovoltaic branch circuits through the communication wires.

15. The PV controller of claim 14 wherein the PV controller is configured to perform a nonredundant operational function for one or more ACPV branch circuits, the performance of the nonredundant operational function requiring an exchange of ACPV operational data between the ACPV branch circuits and the PV controller.

16. The PV controller of claim 14, further comprising one or more sensors coupled to the main power line to provide feedback to the gateway device.

17. The PV controller of claim 14, wherein the gateway device includes an antenna for wireless communication over a network.

18. A method for generating power within an alternating current (AC) module system, the method comprising:
   receiving power signals from a plurality of AC photovoltaic (PV) branch circuits at a PV controller, wherein the PV controller is coupled to a main service panel via a main line;
   aggregating the power signals within the PV controller;
   filtering the power signals in the PV controller;
   detecting information about the power signals using a gateway device within the PV controller;
   communicating nonredundant PV branch circuit operational instructions to the PV branch circuits using the PV controller, the nonredundant PV branch circuit operational instructions communicated from the PV controller and designated for operational use by one or more of the PV branch circuits; and
   supplying power from the PV controller to the AC photovoltaic (PV) branch circuits.

19. The method for generating power of claim 18 further comprising:
   performing phase lock loop operations using the power signal for reduction of noise in a frequency band.

* * * * *